(12) United States Patent
Freeling-Wilkinson

(10) Patent No.: US 11,701,981 B2
(45) Date of Patent: Jul. 18, 2023

(54) ELECTRIC VEHICLE CHARGING STATION

(71) Applicant: URBAN ELECTRIC NETWORKS LTD, London (GB)

(72) Inventor: Olivier Freeling-Wilkinson, Cirencester (GB)

(73) Assignee: URBAN ELECTRIC NETWORKS LTD, London (GB)

(*) Notice: Subject to any disclaimer, the term of this patent is extended or adjusted under 35 U.S.C. 154(b) by 0 days.

(21) Appl. No.: 17/051,536

(22) PCT Filed: Apr. 16, 2019

(86) PCT No.: PCT/GB2019/051087
§ 371 (c)(1),
(2) Date: Oct. 29, 2020

(87) PCT Pub. No.: WO2019/215423
PCT Pub. Date: Nov. 14, 2019

(65) Prior Publication Data
US 2021/0053456 A1  Feb. 25, 2021

(30) Foreign Application Priority Data

May 8, 2018  (GB) ...................................... 1807487

(51) Int. Cl.
*B60L 53/31* (2019.01)
*B60L 53/35* (2019.01)
(Continued)

(52) U.S. Cl.
CPC ............... *B60L 53/31* (2019.02); *B60L 53/16* (2019.02); *B60L 53/18* (2019.02); *B60L 53/35* (2019.02)

(58) Field of Classification Search
CPC .......... B60L 53/31; B60L 53/35; B60L 53/16; B60L 53/18
(Continued)

(56) References Cited

U.S. PATENT DOCUMENTS 8,022,667 B2 * 9/2011 Anderson ............... B60L 53/16
320/109
9,701,209 B2 7/2017 Fontana et al.
(Continued)

FOREIGN PATENT DOCUMENTS

CH          688598 A5    11/1997
CN        105826981 A     8/2016
(Continued)

OTHER PUBLICATIONS

Tranlation of DE 10 2011 105 421 A1.*
(Continued)

*Primary Examiner* — Suresh Memula
(74) *Attorney, Agent, or Firm* — Armstrong Teasdale LLP

(57) ABSTRACT

An electric vehicle charging station (10) comprises a pillar (12) and a casing (14) for installing underground. The casing (14) has a base (26), a side wall (24) and a top (22) defining an inner space, an opening (28) being provided in the top (22) for receiving the pillar (12). The electric vehicle charging station (10) includes a power socket (30) for connection to a power supply and for receiving a power connector of an electric vehicle. The power socket (30) is joined to the pillar (12) and situated near a top end of the pillar (12), the bottom end of the pillar (12) is received in the opening (28) of the casing and the pillar (12) is movable between a retracted position for storing the pillar (12) within the inner space of the casing (14) below ground, and an extended position for supporting the power socket (30) outside the casing (14) above ground.

21 Claims, 7 Drawing Sheets

(51) Int. Cl.
*B60L 53/16* (2019.01)
*B60L 53/18* (2019.01)

(58) Field of Classification Search
USPC ........................................................ 320/109
See application file for complete search history.

(56) References Cited

U.S. PATENT DOCUMENTS

| | | | |
|---|---|---|---|
| 2011/0050167 A1 | 3/2011 | Kissel, Jr. et al. | |
| 2011/0066515 A1 | 3/2011 | Horvath et al. | |
| 2011/0145141 A1* | 6/2011 | Blain | B60L 3/04 |
| | | | 705/39 |
| 2013/0015816 A1* | 1/2013 | Bianco | B60L 53/31 |
| | | | 320/109 |
| 2013/0257373 A1 | 10/2013 | Mallon, IV et al. | |
| 2013/0307477 A1* | 11/2013 | Reinschke | H02J 7/0042 |
| | | | 320/109 |
| 2014/0354229 A1 | 12/2014 | Zhao et al. | |
| 2015/0028797 A1 | 1/2015 | Miller et al. | |
| 2015/0042278 A1 | 2/2015 | Leary | |
| 2015/0306974 A1 | 10/2015 | Mardall et al. | |
| 2016/0207406 A1* | 7/2016 | Kauffmann | B60L 53/124 |

FOREIGN PATENT DOCUMENTS

| | | | | | |
|---|---|---|---|---|---|
| CN | 206358009 | U | | 7/2017 | |
| CN | 107696912 | A | | 2/2018 | |
| CN | 107791877 | A | * | 3/2018 | |
| CN | 110509802 | A | * | 11/2019 | |
| CN | 111098739 | A | * | 5/2020 | |
| CN | 111993929 | A | * | 11/2020 | |
| DE | 102011105421 | A1 | * | 12/2012 | .............. B60L 53/14 |
| DE | 102011105421 | A1 | | 12/2012 | |
| EP | 0788212 | A2 | | 8/1997 | |
| EP | 2039557 | | * | 3/2009 | |
| EP | 2039557 | A1 | | 3/2009 | |
| GB | 2471879 | A | | 1/2011 | |
| GB | 2541654 | A | | 3/2017 | |
| JP | 2009278711 | A | | 11/2009 | |
| JP | 2011160615 | A | | 8/2011 | |
| JP | 2012100448 | A | | 5/2012 | |
| WO | 9810144 | A1 | | 3/1998 | |
| WO | 2010051477 | A2 | | 5/2010 | |
| WO | 2015128498 | A1 | | 9/2015 | |
| WO | 2017037021 | A1 | | 3/2017 | |
| WO | 2019073271 | A1 | | 4/2019 | |
| WO | WO-2020252671 | A1 | * | 12/2020 | .............. B60L 53/35 |

OTHER PUBLICATIONS

PCT International Search Report and Written Opinion of the International Searching Authority for International Application No. PCT/GB2019/051087, dated Jul. 11, 2019; 16 pp.
Search Report for GB Application No. 1807487.2 dated Oct. 19, 2018, 3 pages.
International Search Report and Written Opinion of the International Searching Authority for International Application No. PCT/GB2018/052968, dated Dec. 19, 2018, 15 pages.
Search Report for GB Application No. 1716891.5 dated Apr. 16, 2018, 4 pages.
Notice of Reasons for Refusal for Patent Application JP 2021-538932 dated Aug. 5, 2022; 14 pp.
EP Examination Report for Patent Application EP 19719595.1 dated Aug. 25, 2022; 2 pp.
First Office Action for Chinese Patent Application No. 2018800786627 dated Sep. 21, 2022; 11 pp.
First Office Action for Chinese Patent Application No. 2019800429573 dated Sep. 20, 2022; 11 pp.

* cited by examiner

ELECTRIC VEHICLE CHARGING STATION

The present invention relates to an electric vehicle charging station.

CROSS-REFERENCE TO RELATED APPLICATIONS

This application is a U.S. National Phase Application of PCT/GB2019/051087, filed Apr. 16, 2019, which claims the benefit of priority to GB Application No. 1807487.2, filed May 8, 2018, the contents of which are hereby expressly incorporated by reference in their entirety.

BACKGROUND TO THE INVENTION

Electric vehicles are increasingly popular, particularly electric cars. Electric vehicle batteries must be recharged regularly, and this requires the vehicle to be parked next to a charging station for an extended period of time, typically over 40 minutes. Because of the non-instantaneous nature of charging, as opposed to refuelling a petrol or diesel vehicle, there is a need to provide a large number of charging stations to service the needs of the growing numbers of electric cars in use.

Because of this, many cities have installed electric vehicle charging stations on streets. Typically, the electric vehicle charging station includes a column installed on the pavement on which is mounted one or more sockets connected to mains power. The sockets must be mounted on a column or other structure to support the charging socket at an appropriate height, and this is a regulatory requirement in many countries.

However, in areas with high pedestrian footfall this can be undesirable as it restricts pavement space, increasing congestion among pedestrians. Charging station columns may also be considered unsightly as they lead to a more cluttered urban environment. Finally, the presence of additional fixed street furniture makes street cleaning more difficult, as it necessitates cleaning around the street furniture.

In addition to the lack of above-ground space in busy urban environments, there is often limited availability of space below ground. The depth of excavations is typically limited to avoid disturbing utilities such as water pipes, power cables and drainage, which may be installed relatively close to the surface in some areas.

It is an object of the present invention to provide an improved electric vehicle charging station.

Statement of Invention

According to a first aspect of the present invention, there is provided an electric vehicle charging station comprising: a casing for installing below ground having a base, a side wall and a top defining an inner space, an opening being provided in the top; a pillar; and a power socket for connection to a power supply and for receiving a power connector of an electric vehicle, the power socket being mounted in a side of the pillar which is proximate an upper end of the pillar, a lower end of the pillar being receivable in the casing and the pillar being movable through the opening between a retracted position for storing the pillar within the inner space of the casing below ground, and an extended position above ground for supporting the power socket outside the casing above ground.

Optional features are provided in the dependent claims.

The casing provides a housing for electronics, mechanical components and the pillar in the retracted position. The casing can be installed below ground, allowing the charging station to be installed on a pavement without causing obstruction when in the retracted position. In the retracted position, the pillar is entirely concealed within the casing. When the charging station is to be used, the pillar is raised out of the casing through the opening in the casing to the extended position. It is envisaged that the top surface of the casing will be installed at or near ground level, and indeed it may be continuous with the pavement. The pillar then projects above the pavement, providing a charging socket at an appropriate height to satisfy regulatory requirements.

The casing may remain below ground (or substantially no higher than the surface of the ground) during use. The pillar may move relative to or through the casing.

The casing may include a secondary compartment, optionally at the front or rear or side, for receiving excess cable or wire. This is in addition to a main compartment for the pillar and pillar-extending or retracting means. In other words, the casing is a multi-compartment casing for providing storage for cable. A plate may be secured to the top of the casing. The plate may have an aperture corresponding to the pillar. Removal of the plate allows for facile in situ servicing or repair.

The electric vehicle charging station may further include a powered actuator connected to the pillar and to the casing, in which the powered actuator is arranged to cause the pillar to move relative to the casing between the extended position and the retracted position.

The powered actuator provides a means of moving the pillar to the extended position without requiring physical exertion from the user. This also avoids the need to provide a handle or grip on the top of the pillar, which may be a trip hazard in the retracted position.

The electric vehicle charging station may include a hydraulic actuator or arm. The hydraulic arm may be disposed under the pillar. The hydraulic arm may be disposed in a position offset from a centre of the pillar. A pump may be provided to operate the hydraulic actuator. The hydraulic actuator (and pump where applicable) may use oil for extending/retracting the arm. The pump may be disposed in the casing. The pump may be disposed behind the actuator.

The hydraulic actuator may be a multi-stage hydraulic actuator (such as a two-stage hydraulic actuator). This means that the actuator has a reduced vertical height in the collapsed or retracted configuration, and so reduces the depth which must be excavated for installing the station. In other words, the extent of the station below the surface of the ground is minimised. Thus the hole required for the station can be made shallower to the extent that it lies above a depth where sub-surface pipes and cables are normally laid. For example, the casing may be less than 1 m or less than 0.75 m in height. The casing may be about 0.6 m or less, or 0.5 m or less, in height.

The pillar may be a telescopic pillar including a first section and a second section, each section being a tubular member having a side wall defining a hollow interior and two ends. The second section may be slidably disposed within the hollow interior of the first section.

The telescopic pillar allows the charging socket to be supported at the required height above ground in the extended position, while allowing the pillar to collapse to a shorter length in the retracted position. This means that less vertical space is required below ground to store the pillar in the retracted position, which allows the charging station to be installed in locations where utilities such as water and power cables run close to the surface. The second section is slidably disposed within the first section so that, in the retracted position, it may be held within the first section, i.e. with the majority of its axial extend overlapping the axial extend of the first section, while in the extended position, it may be held at least partially outside the first section to increase the overall length of the pillar.

Guide means (or alignment means) may be provided for the pillar, so that when it extends or retracts it does so in a straight line. One or more guide rods may be provided. The pillar may be connected to the guide means, such as guide rod(s) or column(s). For example a connector or frame may be provided. The at least one rod or column may be arranged on an axis substantially parallel to a longitudinal axis of the pillar.

A frame may be used to connect the pillar to a plurality of rods. Preferably a plurality of guide rods are provided. The guide rods may be provided adjacent to corners of the pillar. The guide rod(s) may be adjacent to the pillar, within the casing.

A single power socket may be provided. Two power sockets may be provided. The sockets may be provided on different sides of the pillar. The sockets may be provided on opposite sides of the pillar. The actuator may be disposed (or connected to the pillar) at a location disposed between the sockets.

The pillar may be disposed partially or substantially fully outside the casing in the extended position. That is, the first and second (and any other) sections of the pillar may be above ground.

The pillar may extend at least 0.4 m or 0.5 m above ground, in the extended position. Preferably, the pillar may extend around 0.4 m or 0.5 m to 1 m above ground in the extended position. In other words, the socket may be provided at about 0.4 m or 0.5 m above ground, if not higher. This is a relatively comfortable height for using the socket without stretching too much or having to bend down.

A top end of the first section may be closed and the second section may be disposed between the top end of the first section and the base of the casing.

Closing the top end of the first section allows it to serve as the topmost part of the pillar, as its upper end is sealed from water. Placing the second section between the top end of the first section and the base of the casing, i.e. arranging the telescope so that the wider sections are at the top and it narrows towards the base, allows the top of the pillar to have a larger footprint than the base. This means that, when the pillar is in the retracted position, the top end of the first section may be flush with the edges of the opening. This helps to seal the casing against ingress of water and dirt, and reduces trip hazards.

If the telescopic pillar were arranged to narrow towards the top, there would need to be a gap around the edge of the topmost section in the retracted position, because the opening would need to be large enough to accommodate the wider lower section(s), i.e. larger than the topmost section.

The first and second sections of the pillar may be considered to be extruded sections. During deployment, the actuator may force the first extrusion outwards. The first extrusion may be adapted to pull on the second extrusion. Various connection or engagement means may be provided for connecting the telescopic sections. For example, a clip or other element or portion of the first extrusion may engage the second extrusion so that movement of the first extrusion causes movement of the second extrusion. The engagement means (whether in the form of a clip or otherwise) may be rigid or flexible, as long as it is sufficiently strong and durable to perform its function.

During retraction, a clip (which may be the same clip as for deployment) or other element or portion of the first extrusion may act on the second extrusion. That is, as the actuator exerts a force to retract the first extrusion, the first extrusion may concurrently exert a force on the second extrusion in the same direction. Concerted retraction of the first and second sections of the pillar can occur. This avoids the lower of the sections remaining extended whilst the upper (first) section is retracted, only for the lower section to suddenly drop into the casing.

Lights or other audio/visual warning means may be used to indicate when the bollard to moving (or about to move).

The powered actuator may be a linear actuator being joined to the first section to the second section. This allows the first section and second section to be pushed apart by the linear actuator, the second section sliding out of the hollow interior of the first section.

The linear actuator may be disposed within the hollow interior of the pillar, such as in the first or second sections. It will be understood that the linear actuator could also be said to be within the hollow interior of the first section. This protects the linear actuator from damage, reduces the chance of a user's finger or other object being caught in exterior moving parts of the pillar, and allows the opening of the casing to conform closely to the footprint of the side wall of the first section, as no clearance is required to accommodate the actuator.

The linear actuator may be joined to a point on the first section which is proximal to the top end of the first section.

Attachment of the linear actuator near the top end of the first section allows the second section to slide further into the first section without being obstructed by the linear actuator.

The power socket may be joined to the first section and may be disposed spaced from the side wall of the first section. A cover may be provided for sealing the socket. The cover may be hinged to or at an upper edge of the socket. The cover may be pivotable away from the socket. The cover may be biased shut (or biased into a closed position), by biasing means such as a spring. The cover may be hinged at a lower edge or to a lower edge of the socket and pivotable away from the socket, in which, in the retracted position, the side wall of the second section is disposed between the side wall of the first section and the socket.

The power socket being disposed spaced from the side wall of the first section accommodates the side wall of the second section and any other sections in the retracted position, in which they slide into the space between the power socket and the side wall of the first section.

A resilient seal may be disposed around a circumference of the cover for sealing the socket from fluid ingress.

Sealing the socket against fluid ingress protects it from water damage due to rain. Advantageously, there is no need to seal the casing and side walls of the pillar, because the electrical and mechanical components within are independently protected. Fluid may therefore safely be allowed to penetrate the pillar and casing, run down to the base and drain away through drainage apertures.

The station may be sealed or waterproofed in various ways. One or more seals may be provided to prevent ingress of water into the station. For example, a seal may be provided around the top of the pillar. A seal may be provided around the base of the second or lowermost extrusion The side wall of each section may have a non-circular profile. This improves the stability of the pillar, as the sections cannot rotate relative to one another. The pillar therefore resists deformation under torsion, which may damage the internal mechanical and electrical components.

Each pillar may have a side wall of approximately trapezoidal (or trapezium-shaped) profile, preferably an elongate trapezoidal profile. In a preferred embodiment, the profile is elongate by having the oblique (angled) sides of the trapezoidal profile being substantially longer than the other two (parallel) sides of the trapezoidal profile. The corners of the trapezium may be rounded. The pillar may be wider at the side or end where the socket is provided, and narrower at the opposing side or end.

The actuator may connect to the pillar in a region disposed behind the socket. The socket may be provided on a side of the pillar. The actuator may connect to the pillar towards the narrower side or end of the pillar.

An aperture may be provided in the base of the casing or in the side wall of the casing proximal to the base of the casing for draining fluid from the casing.

This prevents build up of fluid in the casing, which could damage the mechanical or electrical components. Fluid that penetrates the casing, for example rain, can drain through the apertures to the surrounding earth or rock.

The pillar may be hollow and a sheath may be provided within the pillar, the sheath extending through the length of the pillar and being hollow for housing electrical cables.

This protects the electrical cables which power the socket and prevents them from becoming caught in moving parts within the pillar.

A load sensor may be provided. The load sensor may be provided on the casing, for example on top of the casing. This can detect if a vehicle is parked on top of the casing which might obstruct pillar extension. The load sensor may be provided on the pillar for detecting a load on the pillar. The load sensor can be used to detect if there is an obstruction above the pillar, for example a person standing on the top of the pillar, and prevent the pillar from extending in this condition. This avoids damage to the pillar, particularly to the actuators, and may avoid frightening pedestrians. The load sensor may be provided substantially central on top of the pillar.

The pillar may include a floating plate (or sprung plate). If a load or pressure threshold is exceeded—for example, because an obstruction is encountered in the path of the pillar before extending or before fully extended—the pillar may not extend, or the pillar may retract if in the process of extending. The threshold may be set at 5 kg, 10 kg, 15 kg or any other suitable value. The pillar should still be able to extend from the ground through snow, ice or other debris.

The station or pillar may be adapted to detect obstructions. For example, a proximity sensor or light sensor may be provided (optionally on the pillar) for detecting obstructions. That is, to determine if the pillar can be fully deployed without hitting anything. For example, even though a load is not provided directly on top of the pillar, a vehicle may overhang the pillar. In this scenario, it is preferable not to deploy the bollard fully in case damage is caused to the station and/or overhanging portion of a vehicle.

The station may be adapted to detect if it is impacted. The station may be adapted to stop or prevent pillar movement if impacted. The station or pillar may be adapted to cease charging and/or isolate the mains power supply and/or ground the station, if an impact occurs. For example, a tilt sensor or accelerometer may be provided to detect an impact. The controller may then immobilise the pillar and/or isolate and ground the station to mitigate the electrical hazard, should there be sufficient damage to expose electrically charged portions.

The pillar may include a third section, the third section being a tubular member having a side wall defining a hollow interior and two ends, and the third section being slidably disposed within the hollow interior of the second section. This allows the pillar to collapse to a smaller length while being able to support the socket at the same height, reducing the below-ground space requirements.

According to a second aspect of the invention, there is provided a method of installing an electric vehicle charging station according to the first aspect of the invention, comprising the steps of excavating a hole in the ground and placing the electric vehicle charging station in the hole.

Installing the electric vehicle charging station below ground allows the pavement to be unobstructed when the charging station is in the retracted position. This improves pedestrian flow, enhances the aesthetic quality of the urban environment and protects the charging station from damage. The casing may be installed first, and preferably secured in place before installing the rest of the station components. A cover or plate may be installed last.

According to a third aspect of the invention, there is provided a method of charging an electric vehicle using an electric vehicle charging station according to the first aspect of the invention, comprising the steps of causing the electric vehicle charging station to move from the retracted position to the extended position; connecting a charging cable to the power socket; once the electric vehicle is sufficiently charged, removing the charging cable from the socket; causing the electric vehicle charging station to move from the extended position to the retracted position.

This method allows electric vehicles to be charged by the side of the street in busy urban environments, without requiring additional permanent street furniture. This reduces pavement obstruction and enhances the aesthetic quality of the urban environment.

Causing the electric vehicle charging station to move from the retracted position to the extended position may include using a portable electronic device to send a message to a processor of the electric vehicle charging station, the message causing the processor to cause at least one actuator of the electric vehicle charging station to move the electric vehicle charging station from the retracted position to the extended position.

This allows the electric vehicle charging station to be used without the user needing to manually raise the pillar, which may be heavy.

According to a fourth aspect of the present invention, there is provided an electric vehicle charging station comprising: a casing for installing below ground having a base, a side wall and a top defining an inner space, an opening being provided in the top; a pillar; and a power socket for connection to a power supply and for receiving a power connector of an electric vehicle, the power socket being mounted proximate an upper end of the pillar, a lower end of the pillar being received in the casing and the pillar being movable through the opening between a retracted position for storing the pillar within the inner space of the casing below ground, and an extended position for supporting the power socket outside the casing above ground.

Any of the features in statements of invention provided previously or subsequently may be provided in the fourth aspect of the invention.

According to a fifth aspect of the present invention, there is provided a charging station for charging the battery of a vehicle. The station can include a base portion configured for mounting in a substructure. The station can include a charging portion having a charging outlet for connection to a vehicle. The station can include a retraction mechanism for moving the charging portion between an extended position in which it extends out of the base portion and a retracted position. The station can include a controller for controlling the retraction mechanism. The controller may be configured to determine whether a predetermined period of time has elapsed since the most recent charging from the charging outlet ceased. The controller may be configured to cause the retraction mechanism to move the charging portion to the retracted position if the predetermined period of time is determined to have elapsed since the most recent electrical supply from the outlet.

Any of the aspects of the invention may comprise any one or more of the following features. Even if the exact terminology used for the following features is slightly different to the foregoing, it will be appreciated that certain features are intended to be equivalent, such that the terms are interchangeable.

The controller may be configured to adjust the predetermined period of time in dependence on the prior behaviour of at least one user.

The charging station may comprise a user interface configured to receive an input from a user and the controller is further configured to adjust the predetermined period of time in dependence on the received input.

The charging station may comprise a receiving apparatus for receiving wireless signals and the controller is further configured to adjust the predetermined period of time in dependence on the received wireless signals.

The receiving apparatus may be configured to receive wireless signals via at least one of Bluetooth®, Wi-Fi, NFC (near-field communication) or RFID.

The controller may be configured to adjust the predetermined period of time in dependence on a measure of user proximity derived from the received wireless signal. The controller may be configured to determine the charge of a connected vehicle.

The controller may be configured to adjust the predetermined period of time in dependence on the most recent determined charge of a connected vehicle.

The controller may be configured to adjust the predetermined period of time in dependence on the time of day.

The controller may be configured to adjust the predetermined period of time in dependence on signals received from nearby charging stations.

The controller may be configured to adjust the predetermined period of time in dependence on the weather.

The controller may be configured to determine if the movement of the charging portion or retraction mechanism is obstructed, and to prevent movement if an obstruction is detected.

The charging portion may be attached to the charging outlet via a charging cable. The controller may be further configured to cause the charging portion to reel in the charging cable upon before causing the retraction mechanism to move the charging portion to the retracted position.

The charging portion may comprise a telescopic column.

The charging outlet may comprise at least one of an electrical socket and a wireless electric charging apparatus.

The charging station may comprise a data input cable, and wherein the controller may extend or retract the charging portion in dependence on data received via the data input cable.

The charging portion may be configured to charge the battery of an electric road vehicle.

The retraction mechanism may be configured to move the charging portion substantially vertically between an extended position and a retracted position.

The base portion may be configured for mounting in a substructure comprising a roadway or walkway.

The controller may be further configured to detect a surge in power supplied to the charging station. The controller may be further configured to terminate charging upon detecting a surge in power. The controller may be further configured to cause the retracting mechanism to retract the charging portion when a power surge is detected.

The controller may determine that charging has ceased by determining that a vehicle has been electrically disconnected.

The controller may determine that charging has ceased by determining that the battery of a connected vehicle is fully charged.

The base portion may further comprise an anchoring portion for securing the base portion to the substructure.

The distal end of the charging portion may be substantially flush with one face of the base portion when the charging portion is retracted.

The distal end of the charging portion may be substantially flush with a surface of the substructure when the charging portion is retracted.

One face of the base portion may be substantially flush with a surface of the substructure when the charging portion is retracted.

The base and charging portions may form a seal for resisting entry of fluids into the base portion when the charging portion is retracted.

The charging portion may include a column, post or other structure which can carry a charging outlet. The charging outlet may be any suitable structure for transferring electrical charge to a vehicle, for example, one or more electrical sockets, plugs or wireless charging systems. The charging outlet may be situated directly on the charging portion or may connect to the charging portion by an electrical cable. If a charging cable is used, the charging portion may contain a receptacle or for storing the retracted charging cable or a dock into which the charging outlet can be docked when it is not in use. The charging portion may comprise a drive mechanism for mechanically withdrawing the charging cable when it is not in use. The drive mechanism may withdraw the charging cable into the receptacle, or so that a charging outlet on the distal end of the cable is made flush with the exterior of the charging portion.

The charging station may receive its electricity wirelessly via a wireless receiving apparatus and/or by an underground/embedded cable. The charging station may generally be referred to as a bollard, point, post, pillar, pole, column etc. The charging portion need not be prismatic and may be any arbitrary shape. The charging portion may be monolithic or it may be segmented to allow it to collapse telescopically. A telescopic charging portion allows the system to remain compact to ensure simple installation in many different locations without requiring deep holes to be dug, whilst ensuring the charging outlet meets electrical and mobility compliance standards.

The vehicle to be charged may be any of type (provided it has a battery, by which is meant any electrical storage device), for example the vehicle may be fully electric, an electric/internal combustion hybrid, or fully internal combustion driven. Though the preferred embodiment relates to the charging of a road vehicle, the system could equally be used for charging the battery of any other type of vehicle, for example aircraft, boats, trains, electric wheelchairs and mobility scooters. Conveniently the vehicle uses electrical energy to provide its motive power. The vehicle may engage in Vehicle-to-grid (V2G) activities by communicating with the power grid in order to return/sell electricity to the grid or throttle its charging rate.

The charging system also comprises a base portion 102 which defines a recess into which the charging portion can be retracted. Preferably the base portion and the charging portion are arranged so that the charging portion can be retracted in a vertical or substantially vertical direction into the base portion. Then the base portion can conveniently be installed in a horizontal or substantially horizontal surface such as a road or pavement (sidewalk). Alternatively, the base portion may be arranged so that the charging portion retracts in another direction. For example, the base portion could be installed flush with a vertical wall and the charging portion could retract horizontally.

The charging system is configured to be embedded in a substructure, so as to allow the system to not substantially protrude from the surface when in a retracted state. Though the base portion is preferably installed flush with the substructure, it may protrude from a surface the surface of the substructure as space and other installation requirements dictate. The substructure may be any kind of suitable surface or medium such as a road/runway surface, earth, gravel, a pavement or walkway, a wall or the floor of a garage. The system may also comprise an anchoring portion, for securing the system to the substructure. This anchoring portion may utilise any suitable known method of fixing, such as using one or more of concrete foundations, steel rods, bolts, welding, riveting, cementing, gluing, clipping. The anchoring portion may be located anywhere around the system.

The retraction mechanism may comprise any suitable apparatus for moving the charging portion relative to the base portion. Examples include hydraulic, pneumatic, thermal or magnetic actuators or a mechanical system which may utilise one or more of gears, rails, pulleys and/or chains. The retraction mechanism may be used to cause the charging portion to move between an extended position and a retracted position as appropriate, for example, the charging portion may be extended whilst charging is taking place, but should ideally be retracted when no charging is occurring. In the preferred embodiment, the retraction mechanism will move the charging portion substantially vertically from a substantially concealed, retracted position to a raised, extended position.

The upper part of the charging portion may be substantially within the upper part of the base portion. The ability to retract can help prevent the charging portion from being an obstacle that may inconvenience or harm other users of the area, for example, when retracted pedestrians will not be able to walk into it and cars will not be able to crash into it. The ability to stow the charging portion in its retracted state also helps to maintain the aesthetic appeal of the environment where the system is installed, as it will have a lower profile when the charging portion is stowed.

The controller may be configured to control the retraction mechanism to drive the charging portion from its retracted state to its extended state, and/or to drive the charging portion from its extended state to its retracted state, in response to any one or more of the following factors, in any combination:

A physical user input device associated with the charging station being actuated by a user. The physical user input device could be a push button or touch screen. It could be on the charging station itself or on a nearby placard or operation station.

A signal being received by the controller that indicates that a user has transmitted a demand for use of (or that they no longer want use of) the charging station. For example, a user could indicate using a mobile phone application or an in-car system that he wants to use (or no longer wants to use) the charging station. The application could signal that desire/intent to a server and the server could signal that desire to the charging station over a wired or wireless network to which the controller is connected.

A vehicle that can be charged being detected to be near (or to be no longer near) the charging station. An electrical vehicle may automatically communicate with the charging station to request (or relinquish demand for) charging when it is required.

In the case of retraction, a predetermined amount of time (which may be zero) having elapsed since charging by means of charging station ceased.

In the case of retraction, the charging outlet being docked with the charging portion.

The controller may determine that charging from the charging outlet has ceased, for example by detecting that no current is flowing from the charging outlet or by determining that the battery of a connected vehicle is fully charged. The controller may determine if the movement of the charging portion is obstructed and to prevent the operation of the retraction mechanism if an obstruction is detected. In the case that the charging portion comprises a cable system, the controller may cause the cable to be retracted before the charging portion is retracted. It may block retraction of the charging portion if the cable cannot be fully retracted. The controller may cause the charging cable to be reeled in before the charging portion is moved to the retracted position.

The charging system may also comprise one or more components configured to receive external signals. An underground/embedded cable may be used to transfer data relating to user information, weather or information about nearby bollards. This cable may also transfer power to the system or power may be transferred by a separate cable. A wireless receiving apparatus may be used instead of, or in combination with an underground/embedded cable to receive data.

The wireless data may be in the form of Bluetooth®, Wi-Fi, NFC (near-field communication) or RFID (Radio-Frequency Identification Signals). This wireless receiving apparatus may also receive power that is then transferred to the system or these functions may be performed by two separate receivers. The wireless receiving apparatus may be located on the charging or base portion or on the retraction mechanism. A user interface may be used to receive external signals. The user interface may comprise a touchscreen or a keypad/keyboard and display.

External signals could also be generated in response to the scanning of a 1D, 2D or 3D barcode, situated on the charging station. In one embodiment, the controller causes the retraction mechanism to retract the charging portion if the controller determines that a predetermined period of time has elapsed since the most recent electrical supply. Though a user will typically have control over the extension and retraction, it is advantageous to also have an automated or semi-automated means for retracting the charging portion, for example, if the user forgets to retract the charging portion after use, if the system is finished charging or damaged, or simply to not require a user command. The period of time after which retraction takes place may be set at a fixed value but may alternatively be defined in dependence on a number of factors, which may be used individually or in combination to define the period of time. Examples of such factors are:

- The previous behaviour of a user, which may have been recorded previously and the data committed to memory. Such data be derived from just one user or be defined in dependence on the behaviour of a large number of users. Such data could constitute, for example, the average time between vehicle disconnection and the connection of a subsequent vehicle.
- A user input, which the user may input on each use, or just once upon their first use. If a user knows he is likely to forget to retract the charging portion, they may set it to retract after a shorter time period since disconnection, for example, whilst a user who wants to charge multiple vehicles (and thus must swap between them) may set it to retract after a longer time period since disconnection. Such an input could be provided directly to a user interface on the charging station, programmed into the system during installation or provided wirelessly via Bluetooth®, Wi-Fi, NFC (near-field communication) or RFID. Such a wireless signal could be sent from the vehicle, or a smart phone, smart watch or similar device. The input could also be generated in response to the scanning of a 1D, 2D or 3D barcode, situated on the charging station.
- User proximity, as determined by one of the above mentioned wireless signals. It is possible to determine the proximity between a transmitter and receiver by various methods, such as measuring signal strength or using time of flight measurements. For example, whilst the user remains close, the charging portion may not retract after a longer period of time since disconnection time but if the user becomes distant the charging portion may retract after a shorter period of time since disconnection.
- The charge level of a previously connected vehicle. For example, if the last vehicle to be connected to the system was fully charged, the charging portion may retract after a shorter period of time since disconnection than if the last connected vehicle was only half charged.
- Signals received from nearby charging stations. Nearby charging stations may indicate, for example, whether they are in use, available, damaged, retracted or extended. It may be advantageous for a station to remain in an extended state longer if nearby stations are damaged, so as to advertise its availability and functionality, or, if vandalism is prevalent in the area, the charging portion may retract after a shorter period of time since disconnection.
- The time of day. For example, the charging portion may be caused to retract after a shorter period of time at night due to a heightened risk of vandalism or risk of collisions with vehicles or pedestrians. The charging portion could be caused to retract after a shorter period of time in the day for aesthetic reasons.
- The weather. If the weather is poor, for example, there is heavy rain or extreme temperatures, it may be advantageous for the system to retract quicker than if the weather was good. This may help to protect the internal workings of the system from environmental damage.

These factors may influence the period of time before the charging portion retracts after charging has ceased, individually or in combination. If they are used in combination, some factors may be given a higher weight or may even fully override other factors, for example, if the weather is deemed too hot for safe operation this may override the user's input preferred time.

Any of the factors listed above may also be arranged to cause the charging portion to retract immediately after charging has ceased, i.e. a period of time before retraction equal to zero seconds. Other factors, particularly those which may impact the safety of a user, such as the detection of a surge in power supplied to the charging station, may cause the charging portion to terminate charging and/or retract immediately. In the case the case where wireless charging is occurring, the system may automatically terminate charging and retract the charging portion.

The wireless receiving apparatus mentioned above could be used to control when the retraction mechanism extends the charging portion. If the presence of an RFID tag, which could be in the possession of a user, is detected it may cause the charging portion to be extended. Alternatively, an external device in the user's possession (a smart phone, smart watch, car computer system etc.) could be used to detect the presence of an RFID tag inside the charging system, and send signals which cause the charging portion to be extended. Similarly, a user could use a device to read a visual ID, such as a 1D, 2D or 3D barcode, situated on the charging station, which would cause the device to generate a signal which indicates that the charging portion should be extended.

BRIEF DESCRIPTION OF THE DRAWINGS

For a better understanding of the present invention, and to show more clearly how it may be carried into effect, reference will now be made by way of example only to the accompanying drawings, in which.

DESCRIPTION OF PREFERRED EMBODIMENTS

Figure 1:
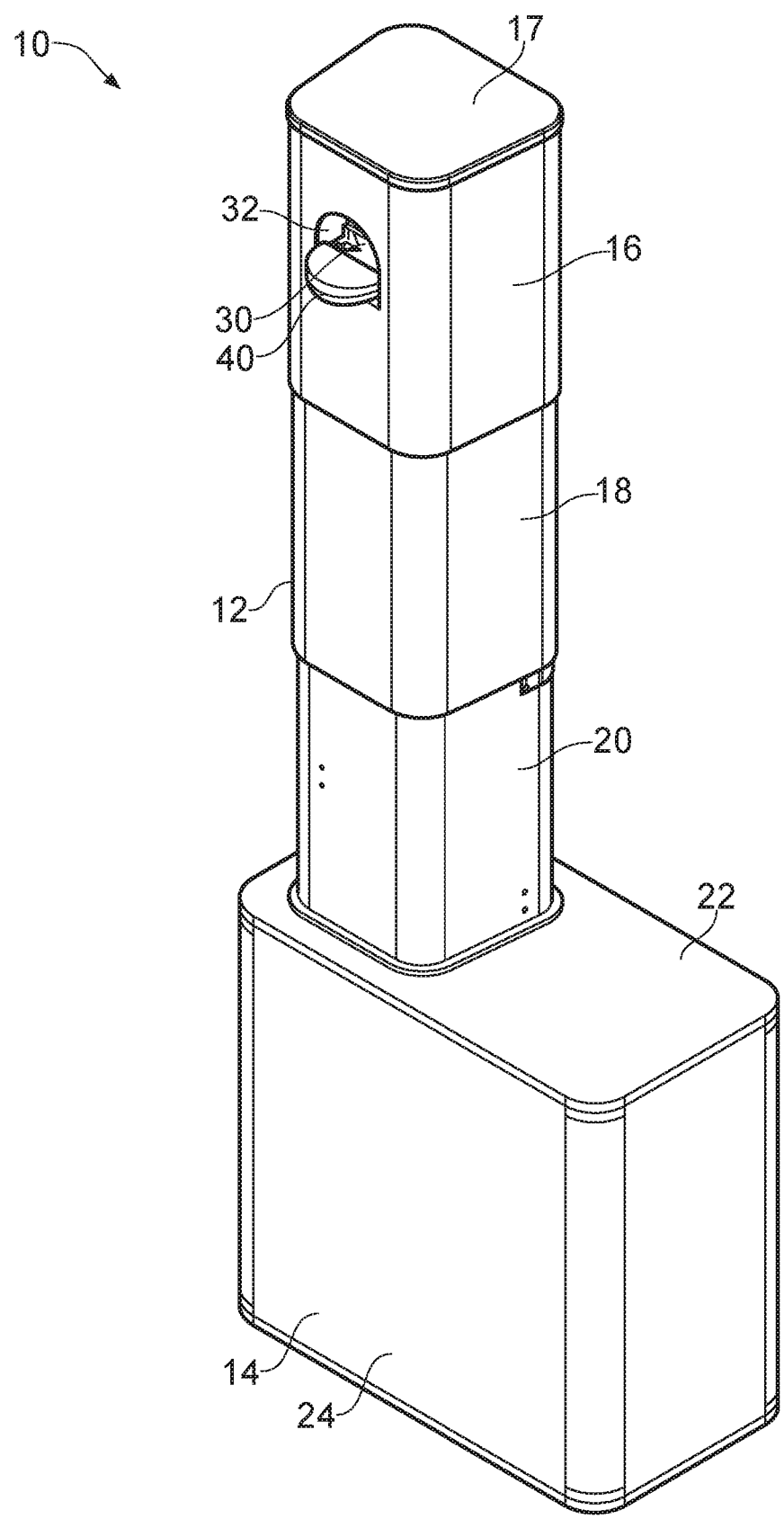
FIG. 1 shows a perspective view of an electric vehicle charger in an extended position.

Referring firstly to FIG. 1, an electric vehicle charging station is indicated generally at 10.

The electric vehicle charging station 10 includes a pillar 12 and a casing 14.

The pillar 12 includes three sections 16, 18, 20. The pillar 12 includes a top section 16, a middle section 18 and a bottom section 20.

Each section 16, 18, 20 is a tubular member having a side wall defining a hollow interior and two ends. Each section 16, 18, 20 has a top end and a bottom end. Each section is a prism, i.e. a profile that has been extruded along an axis. The profile of each side wall has the form of a trapezium with rounded corners.

The profile of the top section 16 is the largest. The profile of the middle section 18 is slightly smaller than the profile of the top section 16 and fits tightly within the top section 16. The profile of the bottom section 20 is slightly smaller than the profile of the middle section 18 and fits tightly within the middle section 18. The three sections 16, 18, 20 therefore form a telescope.

The top end of the top section 16 is closed by a top plate 17.

Each of the sections 16, 18, 20 has the same height, i.e. the same distance between the top end and the bottom end of the respective section.

The casing 14 is a box having a top wall 22, a side wall 24 and a base 26 defining an interior space. The top wall 22 and base 26 are the same shape and size and are concentric. Each of the top wall 22 and base 26 has the shape of a rectangle with rounded corners.

The distance between the upper surface of the top wall 22 and the upper surface of the base 26 is the same as the height of the top section 16.

An opening 28 is provided in the top wall 22. The opening 28 is the same shape as the profile of the top section 16. The opening 28 is sized to receive the top section 16 tightly. The opening 28 is provided close to and edge of the top wall 22. A rubber seal may be provided around the opening 28.

The casing 14 includes a plurality of drainage apertures (not shown). The drainage apertures are through apertures in the side wall 24. The drainage apertures are situated at the bottom edge of the side wall 24, i.e. where the side wall 24 meets the base 26.

The casing 14 and top plate 17 are made of steel. The casing 14 and top plate 17 are strong enough to support at least 250 kg.

In FIG. 1, the pillar 12 is shown in an extended position. In the extended position, the pillar 12 is situated above the opening 28. The sections 16, 18, 20 only overlap by a small amount. The bottom end of the bottom section 20 is received in the opening 28.

A power socket 30 is provided for receiving a charging connector of an electric vehicle. The power socket 30 is disposed within the top section 16. An aperture 32 is provided in a front part of the side wall of the top section 16. The power socket 30 is disposed behind the aperture 32. The power socket 30 is suspended from the underside of the top plate 17.

Figure 2:
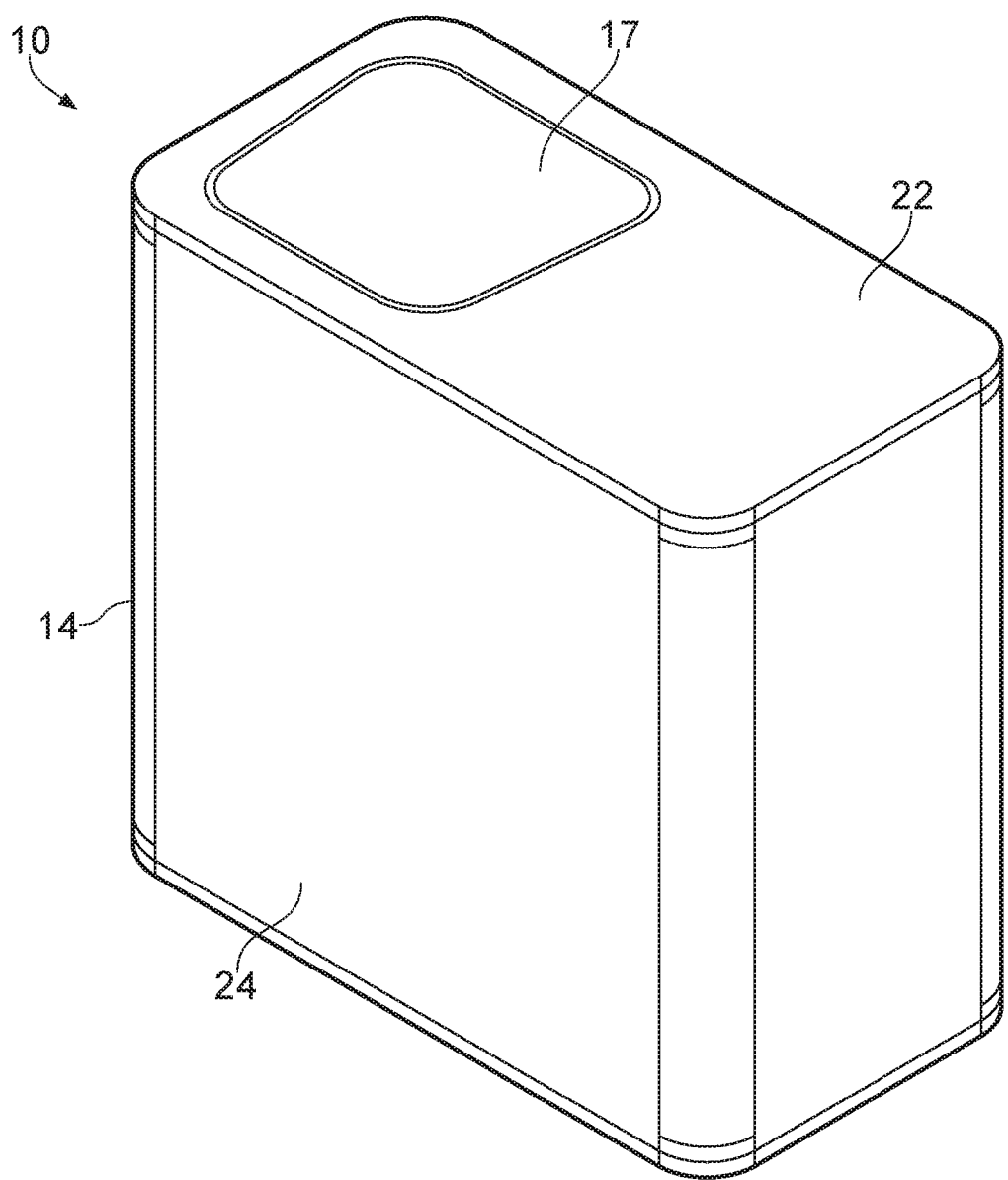
FIG. 2 shows a perspective view of the electric vehicle charger of FIG. 1 in a retracted position.

FIG. 2 shows the electric vehicle charger in a retracted position. In the retracted position, the middle section 18 has slid into the hollow interior of the top section 16 and the bottom section 20 has slid into the hollow interior of the middle section 18. All three sections 16, 18, 20 are housed within the casing 14. The sections 16, 18, 20 are situated directly below the opening 28.

The top plate 17 is received in the opening 28. The top plate 17 is flush with the top wall 22 of the casing.

The casing 14 is larger than the pillar 12. In the retracted position, there is space within the casing 14. This space is used to house charging circuitry (not shown).

Figure 3:
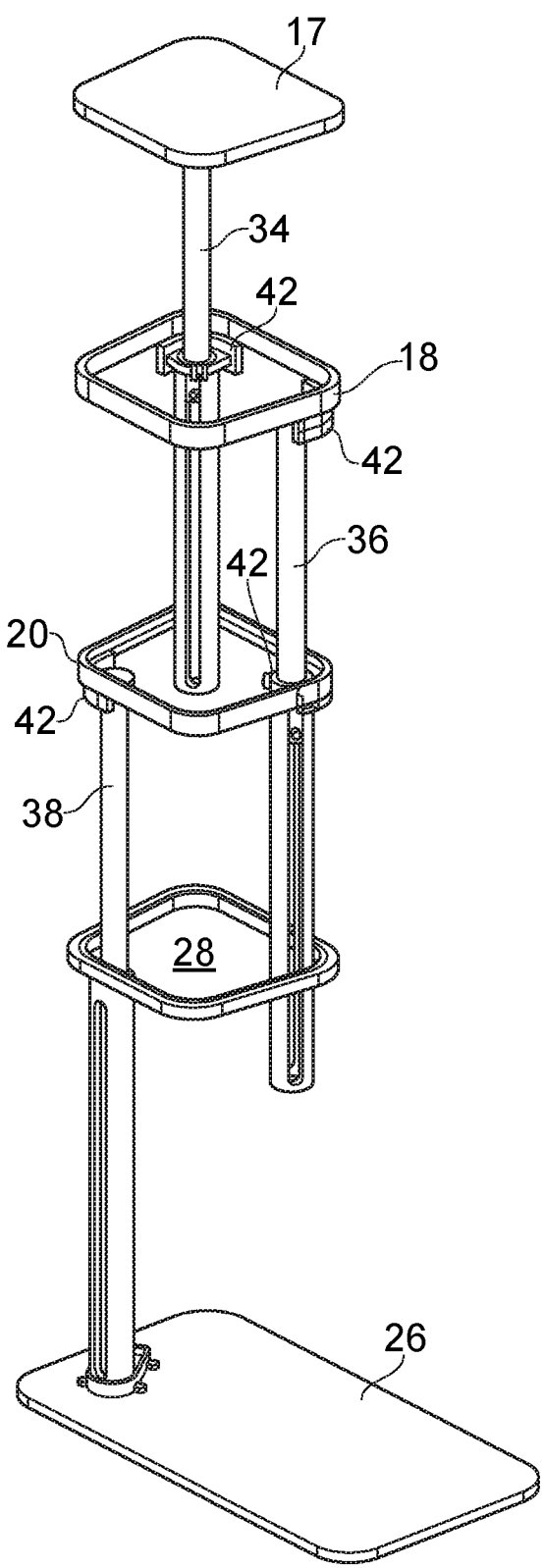
FIG. 3 shows a perspective view of the actuator mechanism of the electric vehicle charger of FIG. 1.

Referring now to FIG. 3, the electric vehicle charging station 10 includes three linear actuators 34, 36, 38: a top linear actuator 34, a middle linear actuator 36 and a bottom linear actuator 38. In FIG. 3, the side walls of the sections 16, 18, 20, have been removed to show the arrangement of the actuators, but the upper edges of the sections remain.

Each linear actuator has a rod and a sheath, the rod being slidably received in the sheath. Each rod has a free top end and a bottom end disposed in the sheath. Each sheath has a top end and a bottom end. The actuators are electrically driven and may, for example, include a rotating screw, which drives a moving nut.

Each actuator is disposed in a corner of the profile of the pillar 12.

The top end of the rod of the top linear actuator 34 is joined to the underside of the top plate 17. The top end of the sheath of the top actuator 34 is attached to the top edge of the middle section 18.

The top end of the rod of the middle actuator 36 is attached to the top edge of the middle section 18. The top end of the sheath of the middle actuator 36 is attached to the top edge of the bottom section 20.

The top end of the rod of the bottom actuator 38 is attached to the top edge of the bottom section 20. The bottom end of the sheath of the bottom actuator is attached to the base 26.

The attachments to the sections are via corner brackets 42.

In the extended position, the rod of the top actuator 34 is disposed in the top section 16, and the sheath of the top actuator is disposed in the middle section 18; the rod of the middle actuator 36 is disposed in the middle section 18, and the sheath of the middle actuator is disposed in the bottom section 20; the rod of the bottom actuator 38 is disposed in the bottom section 20 and the sheath of the bottom actuator is disposed in the casing 14.

In the retracted position, the rods are housed in the sheaths, and the actuators 34, 36, 38, middle section 18 and bottom section 20 are all disposed within the top section 16 within the casing 14.

To move from the retracted position to the extended position, the bottom actuator 38 pushes the bottom section 20 upwards, away from the base 26. This also moves the middle and top sections 16, 18 and actuators 36, 34 upwards.

Simultaneously, the middle actuator 36 pushes the middle section 18 upwards, away from the bottom section 20, and the top actuator 34 pushes the top section 16 upwards, away from the middle section 18.

In other embodiments, the actuators 34, 36, 38 may work sequentially rather than simultaneously.

Figure 4:
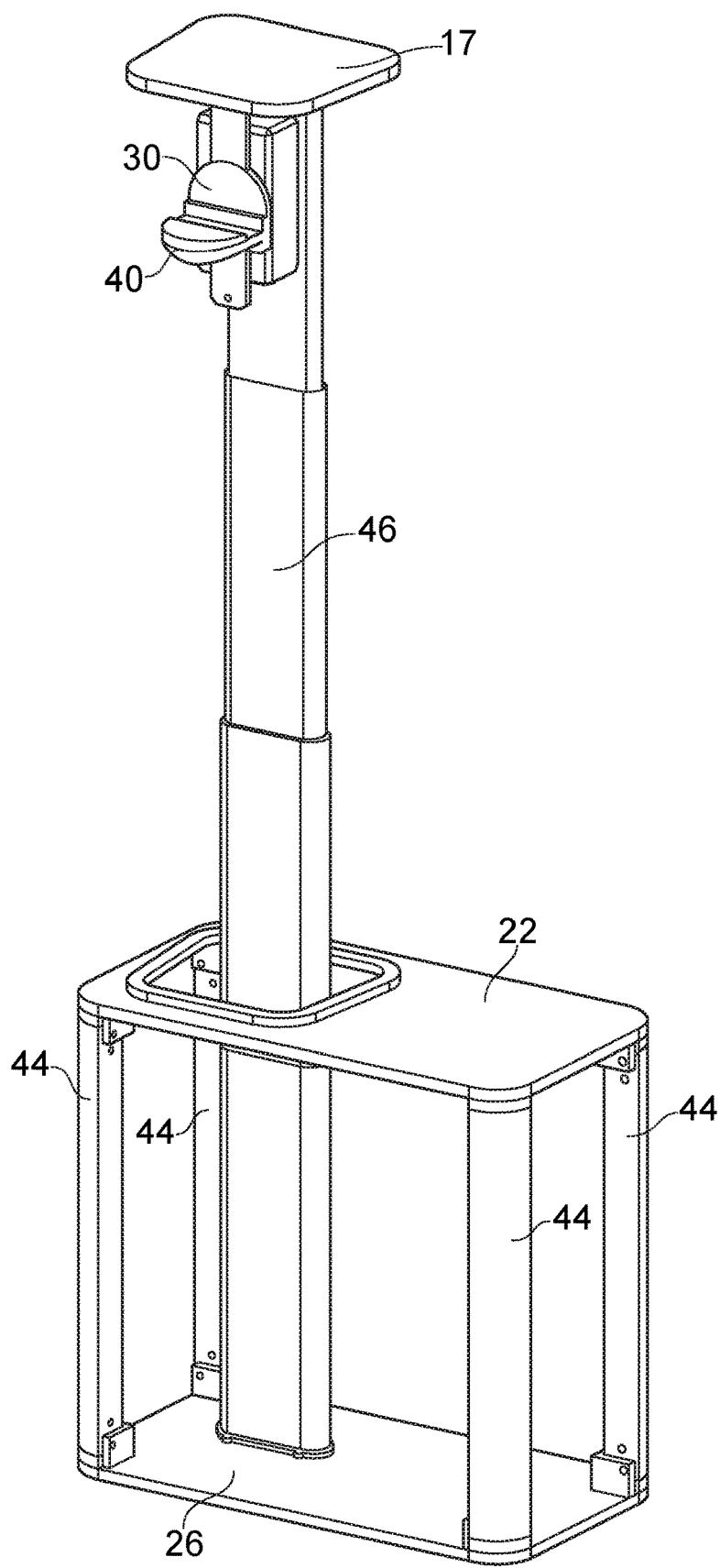
FIG. 4 shows a perspective view of the electric vehicle charger of FIG. 1 with the side walls and actuators removed.

Referring now to FIG. 4, the electric vehicle charging station 10 is shown without the sections 16, 18 20, and the side wall 24 of the casing 14. The actuators 34, 36, 38 have also been removed.

The casing 14 also includes reinforcement columns 44. The reinforcement columns 44 strengthen the casing 14.

The vehicle charging station 10 also includes an inner sheath 46. The inner sheath 46 is collapsible and telescopic. The inner sheath 46 is hollow, for housing electrical power supply cables to the socket 30.

Figure 5:
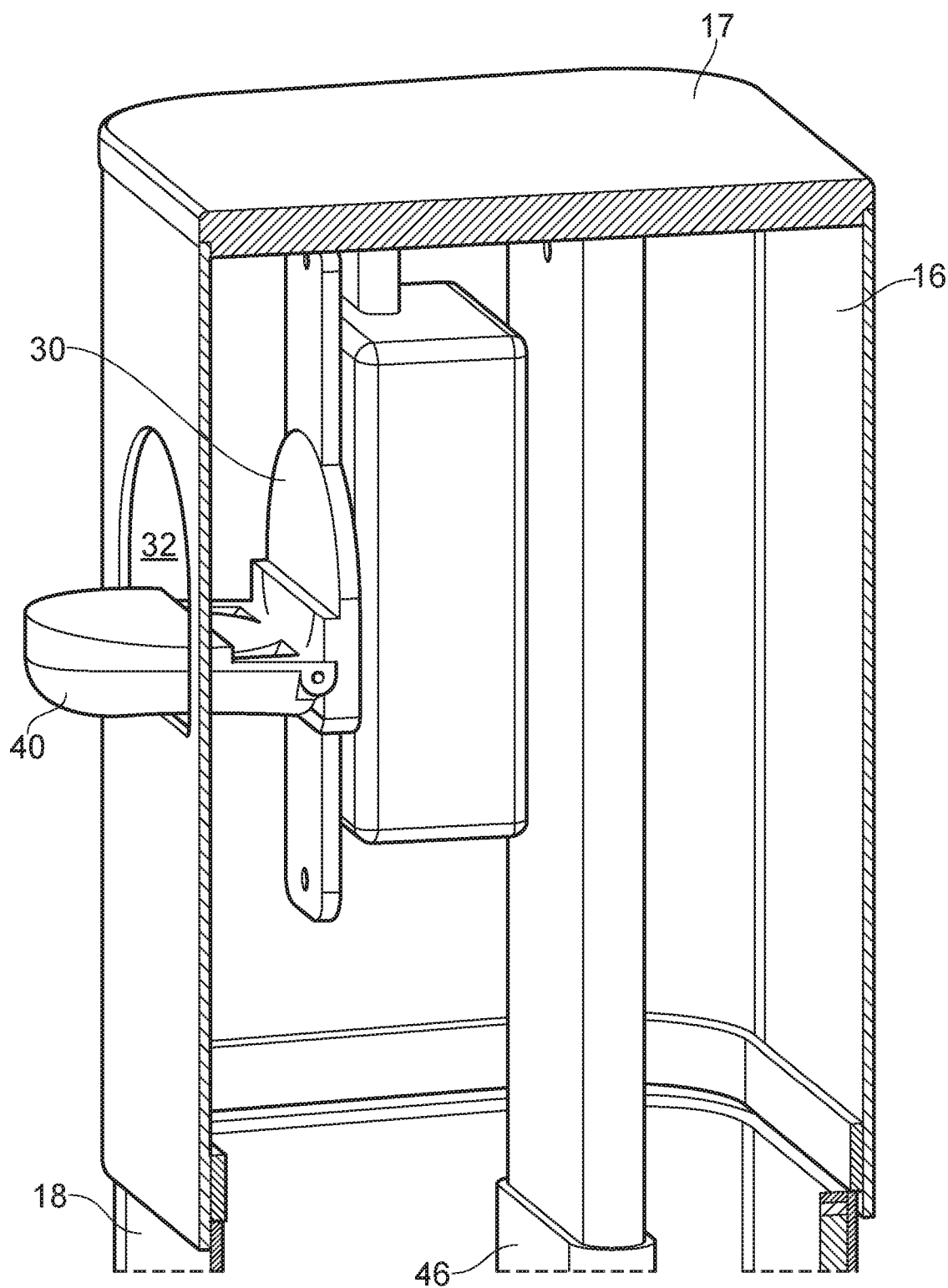
FIG. 5 shows a cross section of an upper portion of the electric vehicle charger of FIG. 1 with the actuators removed.

Referring now to FIG. 5, the socket 30 is spaced from the side wall of the top section 16. The actuators and brackets have been removed for clarity. In the retracted position, the side walls of the middle section 18 and bottom section 20 are received in the space between the socket 30 and the side wall of the top section 16.

A cover 40 is provided for sealing the socket 30. The cover 40 is hinged at a bottom edge to a bottom edge of the socket 30. To open the cover, the cover 40 is pulled forwards, pivoting away from the socket 30 to lie horizontally protruding from the aperture 32 in the top section 16.

In this embodiment, the cover 40 is a single unit of resilient material. The cover 40 is received tightly in the socket 30, sealing the socket 30 against fluid ingress. Alternatively, the cover 40 may be made of a hard material and have a resilient seal disposed around its circumference.

When the pillar 12 moves from the extended position to the retracted position, the side wall of the middle section 18 rises into the top section 16, and a top edge of the side wall of the middle section 18 pushes the cover 40 upwards, pivoting it back into position against the socket 30. It will be understood that the middle section 18 rises relative to the top section 16, but it lowers relative to the casing 14 and surroundings.

It is envisaged that the electric vehicle charging station will include a processor and a wireless communication module. The wireless communication module may be configured to receive wireless signals via at least one of Bluetooth®, Wi-Fi, NFC (near field communication) or RFID (radio frequency identification). The processor is to control the actuators and the wireless communication module is to receive signals to move the pillar from the retracted position to the extended position and, in some embodiments, vice versa.

The signals could be from a handheld electronic device of a user, such as a smartphone.

In this case they will likely be via a short-range wireless communication protocol such as Bluetooth®, Wi-FI, NFC or RFID. Alternatively, the signals could be from an internet server.

It is further envisaged that the electric vehicle charging station 10 will include a load sensor to detect a load on the top plate 17. The load sensor is connected to the processor such that, when a load is detected, the processor does not cause the actuators 34, 36, 38 to move the pillar 12 to the extended position. This prevents the pillar from attempting to rise when, for example, a person is standing on it, which could damage the actuators 34, 36, 38 and frighten the person.

A method of installing the electric vehicle charging station 10 will now be described. A hole is excavated at the side of a road or parking space, for example at the edge of a pavement. The hole is deeper than the height of the casing 14. The hole is then filled with stones or another drainage medium to a depth equal to the height of the casing 14. The electric vehicle charging station 10 is placed in the hole, with the base 26 resting on the drainage medium. The power socket is connected to mains electricity. The upper surface of the top wall 22 is preferably at the same height as the pavement. Finishing steps such as pouring concrete around the casing 14 or re-paving up to the edge of the casing 14 can then be completed.

A method of using the electric vehicle charging station 10 will now be described.

It is envisaged that a database of the locations of a large number of electric vehicle charging stations will be provided. A user wishing to charge an electric vehicle accesses the database, for example via a mapping software application on a portable electronic device such as a smartphone.

The user parks the electric vehicle adjacent to the electric vehicle charging station. The user sends a message from the portable electronic device to the processor of the electric vehicle charging station 10. This could be directly via a Bluetooth (RTM) connection or it could be via an internet server.

When the message is received by the processor, the processor causes the actuators 34, 36, 38 to extend, providing the load sensor does not detect a load. If the load sensor detects a load, the processor does not cause the actuators 34, 36, 38 to extend. In this case, the processor may cause a message to be sent to the user's portable electronic device to notify the user that the electric vehicle charging station 10 is obstructed.

If no load is detected, the pillar 12 is moved from the retracted position to the extended position, rising by the side of the electric vehicle. The user then reaches into the aperture 32 and removes the cover 40 from the power socket 30. The user connects the electric vehicle to the power socket 30 via a charging cable, and the battery of the electric vehicle is charged.

When sufficient charging is complete, the user removes the charging cable from the power socket 30. The user may cause the portable electronic device to send a message to the processor of the electric vehicle charging station 10 to cause the pillar 12 to move to the retracted position. Alternatively, the user may simply leave, and the processor will cause the pillar 12 to move to the retracted position once a time period has elapsed with no message received and no connection to the power socket.

As the pillar 12 moves to the retracted position, the middle section 18 slides into the top section 16, and its side wall is received between the power socket 30 and the side wall of the top section 16. The top edge of the side wall of the middle section 18 then pushes the cover 40 into position over the socket 30.

Figure 6:
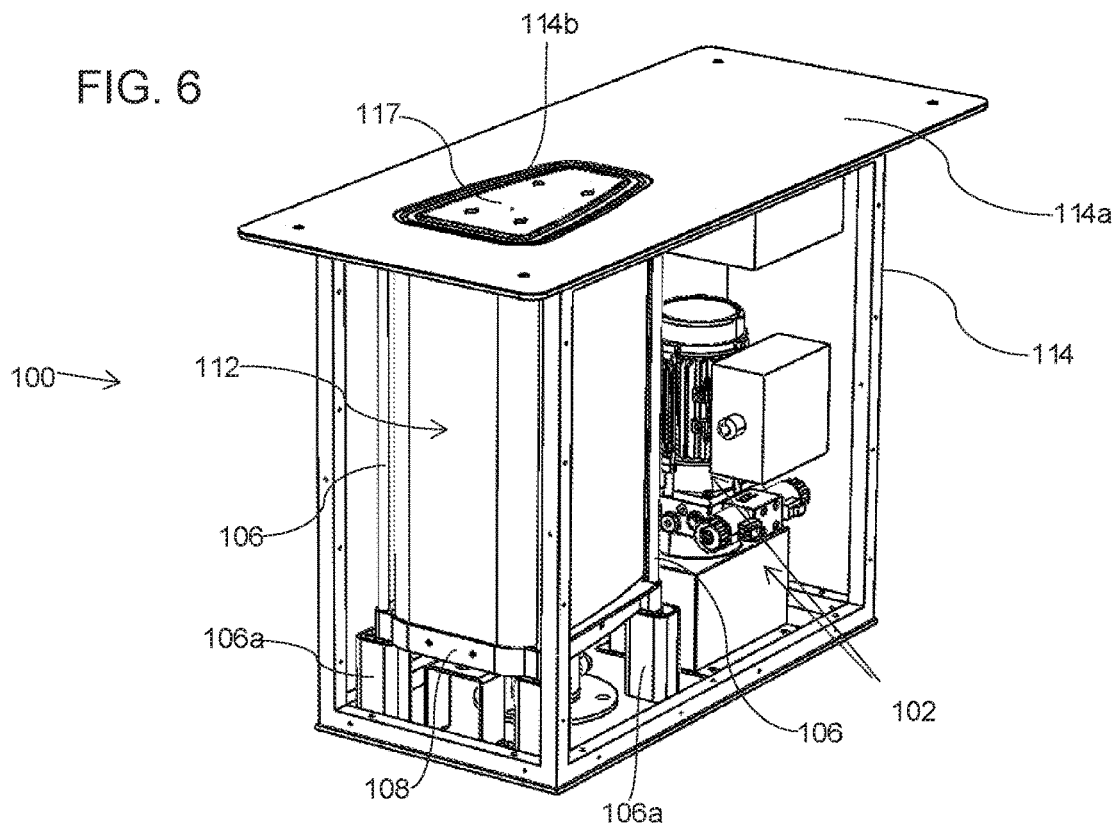
FIG. 6 shows a perspective view of another embodiment of an electric vehicle charging station, with a pillar in a retracted position.
Figure 7:
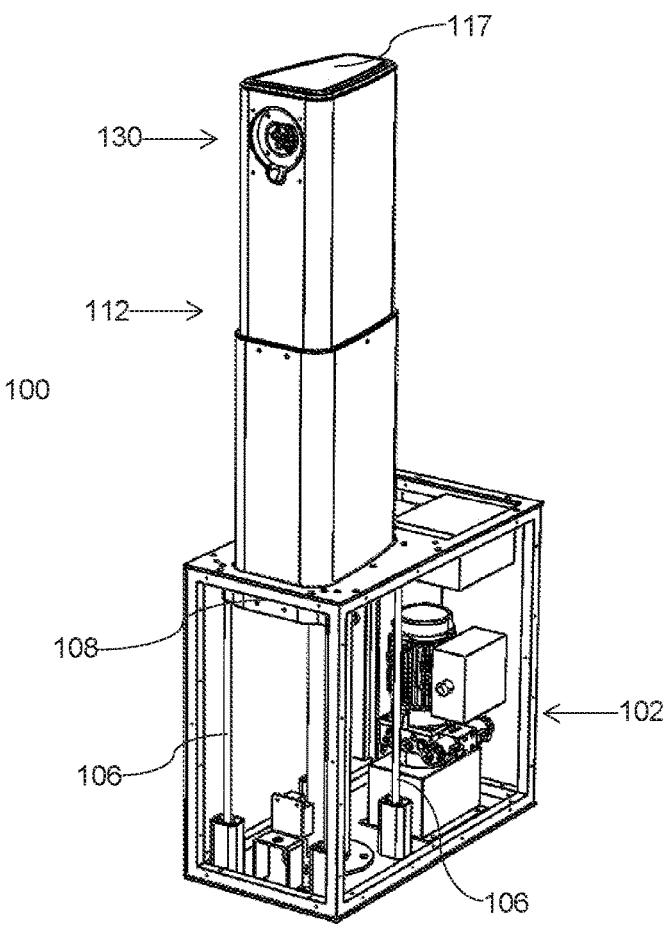
FIG. 7 shows a perspective view of the electric vehicle charging station of FIG. 6, with the pillar in an extended position.
Figure 8:
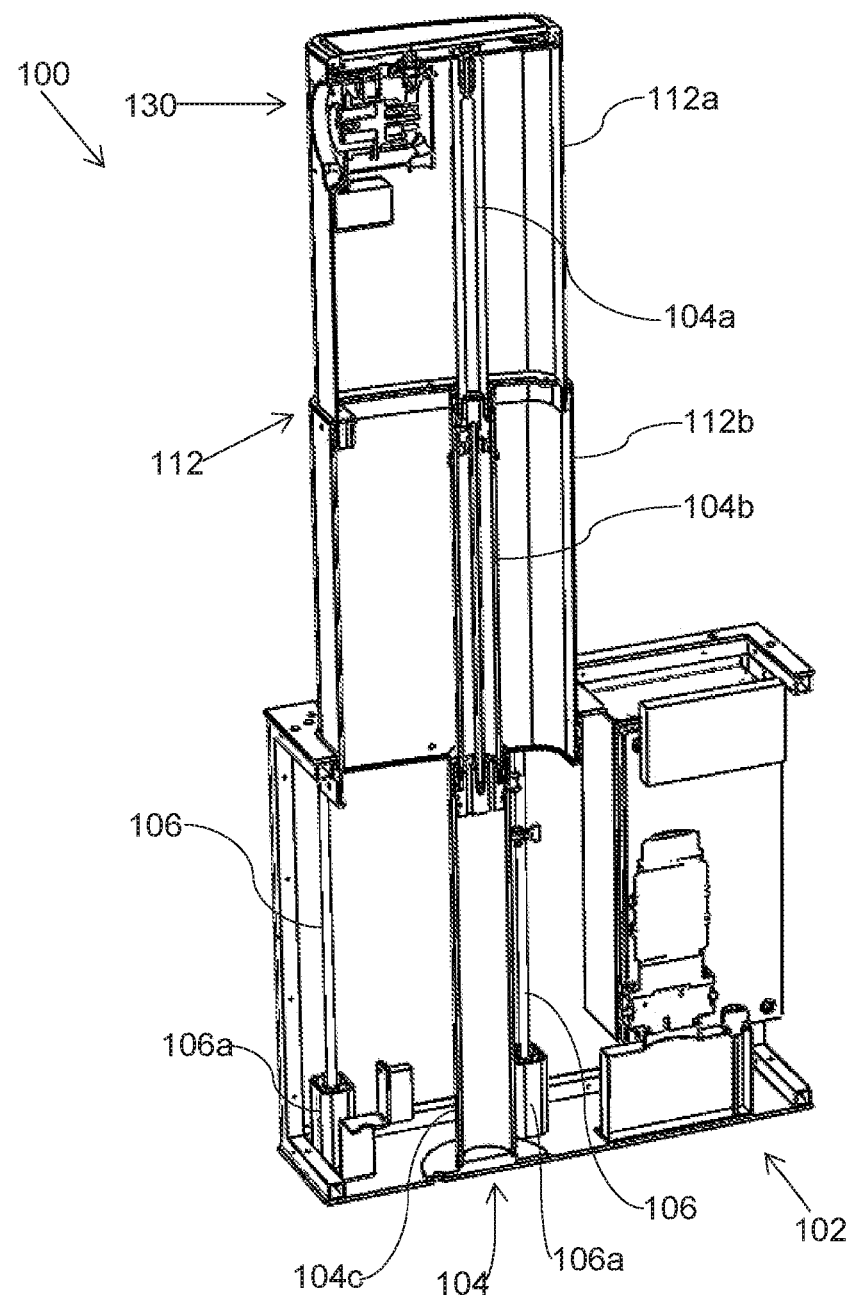
FIG. 8 shows a cross-sectional perspective view through the electric vehicle charging station of FIG. 7.

Referring now to FIGS. 6 to 8, another embodiment of an electric vehicle charging station is shown at 100. The features of this station 100 are similar to those of the preceding embodiments, except where otherwise described.

The station 100 includes a telescopic pillar 112 with a trapezoidal profile. In this embodiment, the first (upper) pillar section 112a is narrower than the second pillar section 112b. Only two pillar sections are provided in this embodiment.

A casing 114 is provided around the pillar 112. Both sections 112ab can be substantially raised out of the casing, although a small portion of the lower section 112b may still remain in the casing 114 when deployed, for example for sealing purposes. A plate 114a covers the top of the casing 114. The plate 114 includes a trapezoidal opening 114b for the pillar. A top 117 of the pillar sits flush with the plate 114a, fitting the opening 114b. A power socket is indicated generally at 130.

A hydraulic pump arrangement is indicated generally at 102. An oil reservoir is also provided, connected to the pump 102. A hydraulic actuator, indicated generally at 104, is connected to the pump 102. The actuator includes first, second and third portions 104abc. The actuator includes a circumferential base flange for secure connection to the casing 114. The first portion 104a of the actuator 104 is connected to the top of the pillar 112, but rearwards of the socket 130. This provides an off-centre connection, such that the actuator is arranged on an axis parallel to the axis of the pillar 112. When deploying the pillar 112, oil is pumped into the actuator. When retracting the pillar, the oil is pumped back to the reservoir.

Vertical guide rods 106 are spaced around the pillar 112. In this embodiment, four rods are provided, but it will be appreciated that any suitable number of rods may be used. The rods 106 are optionally supported at their bases by supports or units 106a.

A frame 108 is provided around the pillar 112. The frame connects to the pillar 112. The frame 108 includes rod-engaging portions which are adapted to run along the rods 106. In this embodiment, the rod-engaging portions are at the corners of the frame 108. The rods 106 and frame 108 help the pillar 112 to deploy and retract in a straight line. This can be useful when the actuator 104 is offset from the middle of the pillar 112.

These embodiments are provided by way of example only, and various changes and modifications will be apparent to persons skilled in the art without departing from the scope of the present invention as defined by the appended claims.

The invention claimed is:

1. An electric vehicle charging station for installation in pavement, comprising:
 a casing for installing below ground having a base, a side wall and a top defining an inner space, an opening being provided in the top;
 a pillar which is moveable between a retracted position and an extended position;
 a load sensor provided on the pillar or on the casing, for detecting a load on the pillar or an obstruction above the pillar and for preventing the pillar from extending if the load or obstruction is detected; and
 a power socket for connection to a power supply and for receiving a power connector of an electric vehicle,
 the power socket being mounted in a side of the pillar and proximate to an upper end of the pillar, a lower end of the pillar being receivable in the casing and the pillar being movable through the opening between the retracted position for storing the pillar within the inner space of the casing below ground, and the extended position above ground for supporting the power socket outside the casing above ground;
 wherein, when the pillar is in the retracted position within the inner space of the casing, the pillar is prevented from moving out of the retracted position if the load or obstruction is detected by the load sensor.

2. The electric vehicle charging station as claimed in claim 1, further including a powered actuator joined to the pillar and to the casing, in which the powered actuator is arranged to cause the pillar to move relative to the casing between the extended position and the retracted position.

3. The electric vehicle charging station as claimed in claim 2, in which the powered actuator is arranged to extend along an axis which is substantially parallel to but spaced from a central longitudinal axis of the pillar.

4. The electric vehicle charging station as claimed in claim 1, in which the pillar is a telescopic pillar including a first section and a second section, each of the first section and the second section being a tubular member having a side wall defining a hollow interior and two ends, and the second section is slidably disposed within or around the hollow interior of the first section.

5. The electric vehicle charging station as claimed in claim 4, in which a top end of the first section is closed and in which the second section is disposed between the first section and the base in the extended position.

6. The electric vehicle charging station as claimed in claim 5, further including a powered actuator joined to the pillar and to the casing, in which the powered actuator is arranged to cause the pillar to move relative to the casing between the extended position and the retracted position, in which the powered actuator is joined to the first section or is joined to the first section and to the second section.

7. The electric vehicle charging station as claimed in claim 6, in which the powered actuator is joined to a point on the first section which is proximal to the top end of the first section.

8. The electric vehicle charging station as claimed in claim 4, in which the power socket is joined to the first section and is disposed spaced from the side wall of the first section, a cover being provided for sealing the socket, the cover being hinged at an edge to an edge of the socket and pivotable away from the socket, in which, in the retracted position, the side wall of the second section is disposed between or around the side wall of the first section and the socket.

9. The electric vehicle charging station as claimed in claim 8, in which a resilient seal is disposed around a circumference of the cover for sealing the socket from fluid ingress.

10. The electric vehicle charging station as claimed in claim 4, in which the side wall of each of the first section and the second section has a non-circular profile.

11. The electric vehicle charging station as claimed in claim 4, in which the pillar includes a third section, the third section being a tubular member having a side wall defining a hollow interior and two ends, and the third section being slidably disposed within or around the hollow interior of the second section.

12. The electric vehicle charging station as claimed in claim 4, in which the first section of the pillar includes engagement means arranged to engage the second section of the pillar for extending and/or retracting the pillar.

13. The electric vehicle charging station as claimed in claim 4, in which the telescopic pillar has a bottommost telescopic section and, when the telescopic pillar is in the extended position, the bottommost telescopic section is disposed outside the casing.

14. The electric vehicle charging station as claimed in claim 1, in which one or more apertures are provided in the base of the casing or in the side wall of the casing proximal to the base of the casing for draining fluid from the casing.

15. The electric vehicle charging station as claimed in claim 1, in which the pillar is hollow and a sheath is provided within the pillar, the sheath extending through a length of the pillar and being hollow for housing electrical cables.

16. The electric vehicle charging station as claimed in claim 1, including guide means for extension or retraction of the pillar, the guide means including at least one rod or column arranged adjacent to a corner of the pillar on an axis substantially parallel to a longitudinal axis of the pillar, and a connector between the at least one rod or column and the pillar.

17. The electric vehicle charging station as claimed in claim 1, wherein a top of the pillar is flush with the top of the casing when the pillar is in the retracted position.

18. The electric vehicle charging station as claimed in claim 1, wherein the casing includes a plate, the plate is removably secured at the top of the casing, an aperture is provided through the plate for extension and retraction of the pillar therethrough, and a top of the pillar is flush with a top of the plate when the pillar is in the retracted position.

19. A method of installing an electric vehicle charging station, comprising the steps of
 providing the electric vehicle charging station for installation in pavement, the electric vehicle charging station comprising:
 a casing for installing below ground having a base, a side wall and a top defining an inner space, an opening being provided in the top;
 a pillar which is moveable between a retracted position and an extended position;
 a load sensor provided on the pillar or on the casing, for detecting a load on the pillar or an obstruction above the pillar and for preventing the pillar from extending if the load or obstruction is detected; and
 a power socket for connection to a power supply and for receiving a power connector of an electric vehicle, the power socket being mounted in a side of the pillar and proximate to an upper end of the pillar, a lower end of the pillar being receivable in the casing and the pillar being movable through the opening between the retracted position for storing the pillar within the inner space of the casing below ground, and the extended position above ground for supporting the power socket outside the casing above ground, wherein, when the pillar is in the retracted position within the inner space of the casing, the pillar is prevented from moving out of the retracted position if the load or obstruction is detected by the load sensor; and excavating a hole in the ground and placing the electric vehicle charging station in the hole.

20. A method of charging an electric vehicle using an electric vehicle charging station comprising the steps of causing a pillar of the electric vehicle charging station to move from a retracted position to an extended position, the electric vehicle charging station having a casing installed below ground having a base, a side wall and a top defining an inner space, an opening being provided in the top;

connecting a charging cable to a power socket, the power socket for connection to a power supply and for receiving a power connector of the electric vehicle, the power socket being mounted in a side of the pillar and proximate to an upper end of the pillar, a lower end of the pillar being receivable in the casing and the pillar being movable through the opening between the retracted position for storing the pillar within the inner space of the casing below ground, and the extended position above ground for supporting the power socket outside the casing above ground;

once the electric vehicle is sufficiently charged, removing the charging cable from the socket; and causing the pillar of the electric vehicle charging station to move from the extended position to the retracted position;

wherein the electric vehicle charging station includes a load sensor provided on the pillar or on the casing, for detecting a load on the pillar or an obstruction above the pillar and for preventing the pillar from extending if the load or obstruction is detected, wherein, when the pillar is in the retracted position within the inner space of the casing, the pillar is prevented from moving out of the retracted position if the load or obstruction is detected by the load sensor.

21. The method as claimed in claim 20, in which causing the pillar of the electric vehicle charging station to move from the retracted position to the extended position includes using a portable electronic device to send a message to a processor of the electric vehicle charging station, the message causing the processor to cause at least one actuator of the electric vehicle charging station to move the pillar of the electric vehicle charging station from the retracted position to the extended position.

* * * * *